Patented June 6, 1933

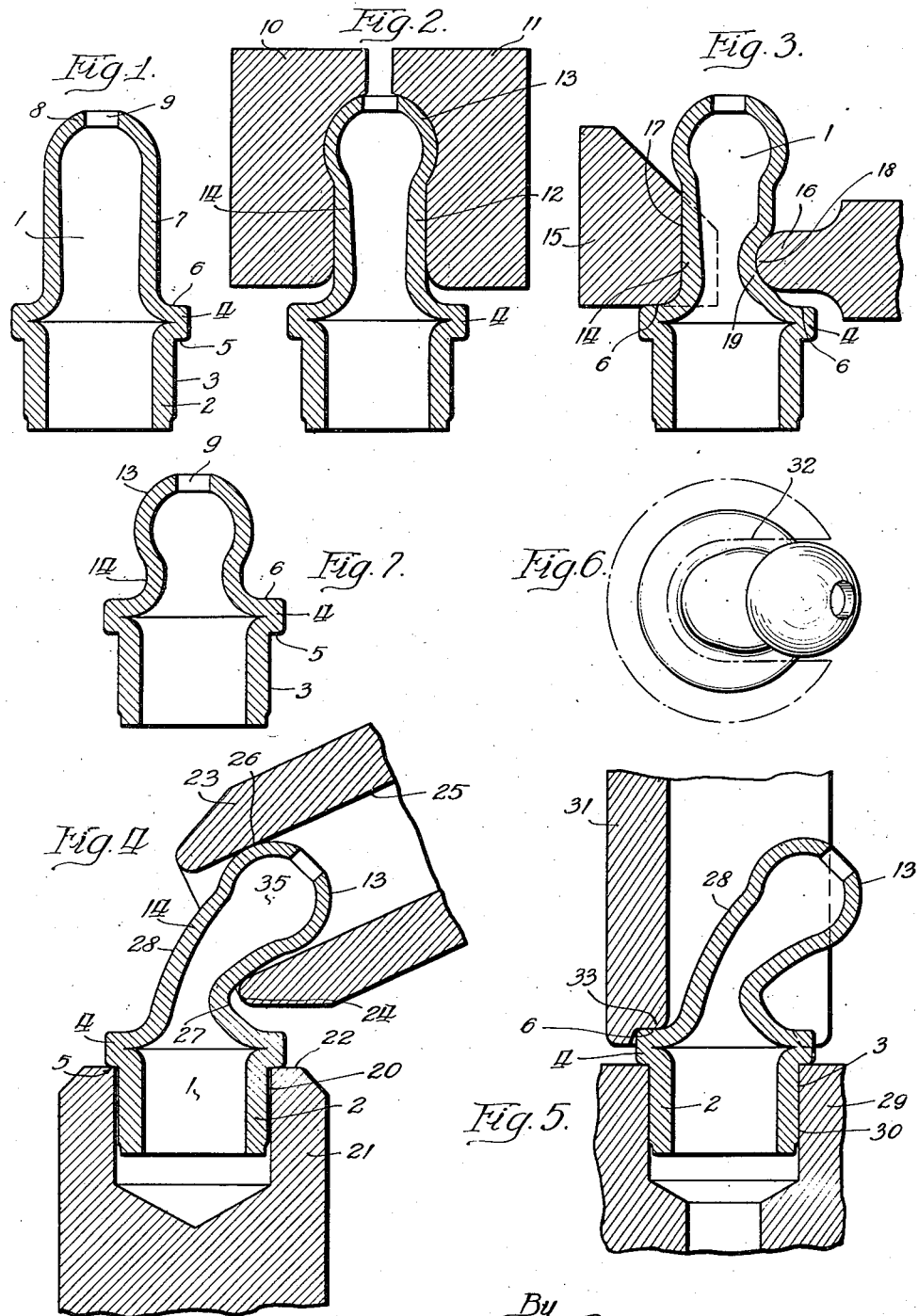

1,912,750

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

METHOD OF MAKING LUBRICATING NIPPLES

Application filed March 14, 1930. Serial No. 435,761.

This invention relates to lubricant nipples and to methods and means for making the same and relates particularly to nipples of the type adapted to be rigidly connected to the bearing elements of machines, etc. and to receive lubricant under pressure from associated lubricating apparatus, such as lubricant guns.

In my co-pending application, Serial No. 401,275, filed October 21st, 1929, I show and describe a lubricant nipple adapted to be screwthreaded into a bearing element to supply lubricant thereto, and adapted to cooperate with the nozzle of a lubricant gun applied to the nipple. The seal between the nozzle and nipple is effected by contact pressure therebetween.

It is to nipples of this pressure contact type that my invention relates.

Pressure contact nipples may be of a socalled straight type, that is formed symmetrically around the axis of the lubricant duct therethrough, and the lubricant gun may be presented thereto coaxially or at an angle to the axis.

In some cases it is desirable that the nipple itself shall be of the so-called elbow type, in which the portion on which the pressure contact is made is deflected or bent over at an angle to the portion of the nipple by which it is secured to the bearing element. One such elbow type of nipple of the contact type is shown in my co-pending application, Serial No. 399,964, filed October 16, 1929.

Nipples are in some cases secured to the bearing element by being screwthreaded thereinto, or by being press-fitted into a bored hole in the bearing element, and my invention relates to both types.

My invention relates, furthermore, to the manufacture of nipples from sheet metal, both of the straight and elbow types, and of the screwthreaded and press-fitted types.

Heretofore, in the quantity production of nipples, the attempt has been made to reduce their cost by producing them on automatic screw machines, but in the case of elbow nipples, this has generally resulted in constructing them from two or more parts assembled together, and the cost thereof has been relatively high.

Attempts to manufacture elbow and straight nipples from sheet metal have not been very successful, because the methods employed have caused the surface contact portions of the nipple to be uneven, resulting in leakage of the lubricant when applied to the nipple under pressure. Prior efforts to provide elbow nipples, by bending a tip thereof, have not been successful, since the flexible tip applied to the nipple base for the purpose have been made relatively large in diameter and of considerable length, and besides being expensive and unsightly are readily deflected, broken, pried or pulled from their positions of use, and have been otherwise objectionable. Such prior nipples also have been made in such a way that either they have comprised a plurality of intervening parts, to be assembled together at considerable expense, or that they are not susceptible of being manufactured in automatic machinery, operable continuously in such a manner that the materials employed in the manufacture of the nipples may be supplied at an inlet portion of the machine and are ejected in completed form from another end of the machine.

My present invention is applicable to the making of sheet metal nipples, and is of especial advantage in connection with the inexpensive manufacture of sheet metal elbow type nipples of the general type illustrated in my prior Patents 161,945 and 1,619,455, both dated March 1, 1927, and is applicable likewise to other types of elbow nipples, particularly of the contact type departing variously from those shown in the above said patents and in the accompanying drawing.

It is, therefore, one of the objects of this invention to provide an improved nipple of the pressure contact type, which may be formed from sheet metal.

Another object is to provide a method and means for producing nipples of the straight type or elbow type from sheet metal, and at very low cost.

Another object is to provide a method and means for producing nipples of the pressure contact type from sheet metal having pressure contact portions free from irregularities, whereon effective seal may be made with a lubricant gun or like apparatus.

Another object is to provide an improved drive fit nipple of the elbow type, which may be made from a single piece of sheet metal, and a method and means for making the same.

Another object is to provide a method and means for making nipples of the pressure contact type from sheet metal, in which the contact portions of the nipple may be formed by a rolling process to render them true for sealing purposes.

Another object is to provide a method and means for forming nipples of the elbow type from sheet metal, whereby the nipple may be bent into its elbow form without danger of breaking or cracking the material.

Another object is to provide a method and means for producing elbow nipples of the pressure contact type from sheet metal wherein the bending operation to produce the elbow form may be carried out without danger of deformation or mutilation of the contacting portions of the nipple.

Another object is to provide an elbow type nipple having a stem portion and a bent portion formed from sheet metal and a method and means for making the same whereby the two portions are formed close together, and the bend is made relatively sharp on the concave side and of relatively large radius on the convex side, and the axis of the pressure contact portion may be near the stem portion.

Another object is to provide a nipple of the press, or drive-fit type formed from sheet metal and provided with an integral flange whereby it may be driven into a bore in the bearing element with which it is associated.

Another object is to provide a method and means for bending into the elbow type nipples formed from sheet metal, which comprise a pressure contact portion and a drive-fit stem portion, and a connecting portion therebetween, wherein the connecting portion may be annealed to facilitate bending the same without annealing the contacting portion.

Another object of my invention is to provide an improved lubricant receiving nipple for bearings which may be readily susceptible of manufacture in a continuous process by specially constructed automatic machinery, at a high rate, at low cost.

Another object of my invention is to provide an improved nipple of the contact type, wherein any of the aforesaid objects are accomplished, inexpensively manufactured from sheet metal, and of highly improved form, functionally considered.

Another object of my invention is to provide an improved contact type nipple having an inlet opening surrounded through a parti-spherical wall integrally joined to a tubular supporting base portion by an immediately connecting portion of substantially reduced diameter, whereby a considerable degree of angularity of contact may be provided for engagement by the end of a tubular nozzle cooperable therewith.

Another object of my invention is to provide a nipple of the contact type, having a tubular stem and a nipple receiving end of reduced diameter, wherein the tip is readily susceptible of bending in portions adjacent the stem.

Another object of my invention is to provide a lubricant nipple having a parti-spherical contact surface at its lubricant receiving tip, a tubular base therefor and a sufficiently slender and elongated intermediate neck providing for a considerable degree of angularity of contact with an annular nozzle contact element to make leak-proof engagement therewith, and at the same time to permit forcible bending of the neck near the base to press the lubricant receiving end laterally of the axis of the stem.

Another object of my invention is to use a portion of the flange situated above the drive-fit portion of the stem as a means against which a preferably slotted assembly tool can abut during the time the elbow nipple is pressed into the bearing.

Another object of my invention is to place this abutting surface between the contacting surface of the elbow nipple and the bearing.

Another object of my invention is to manufacture elbow nipples first by making straight nipples either from bar stock by automatic screw machines or from sheet metal by stamping or drawing presses, then heating a portion of the nipple between the two ends and then bending the nipple at this portion.

Other objects of my invention and the invention itself will become more apparent by reference to the following description of my invention and by reference to the accompanying drawing illustrating the same.

In the drawing:—

Fig. 1 is a cross-sectional view of a sheet metal drawn stamping or blank from which a nipple embodying my invention may be produced;

Fig. 2 illustrates one of the operations performed upon the blank of Fig. 1 in carrying out the nipple producing method of my invention;

Fig. 3 is a view similar to Fig. 2 showing an operation which may optionally be performed subsequent to that illustrated in Fig. 2 preparatory to bending the nipple into the elbow form;

Fig. 4 is a view similar to Figs. 2 and 3 illustrating the operation of bending the nipple into the form of an elbow nipple;

Fig. 5 is a view illustrating a completed nipple of the elbow type made according to my invention, the view showing also one means for assembling the nipple into the bearing element to be lubricated;

Fig. 6 is a plan view of the parts of Fig. 5 taken from above;

Fig. 7 is a view of a nipple of the straight type made according to my invention.

In Figs. 1 to 4, inclusive, I have shown successive operations which may be performed in carrying out the method of producing sheet metal nipples according to my invention. In manufacturing the nipples of my invention I preferably supply the material therefor in the form of a strip, or ribbon, of sheet metal, to the mechanism which is provided with suitable punch, press, die elements, rotary forming means and the like hereinafter more specifically referred to.

These operations may be performed in a punch press through which the band or strip of steel is continuously fed, successive dies of the punch press performing the successive operations, or may be performed in a cam press or eyeleting press provided with multi-automatic feed and with a number of punches, dies, etc., connected to a ram, and with automatic chucks or fingers which transfer the partly formed article from one die to the next successive die. Machines of these types are well known and understood in this art.

The blank so formed, illustrated in Fig. 1, is generally of circular cross-section in plane at right angles to a longitudinal axis of symmetry 1 therethrough. The blank comprises a body or stem portion 2, the outer cylindrical surface 3 of which is of determined diameter, suitable to be press-fitted or drive-fitted into a corresponding hole or bore in a bearing element to which the finished nipple is to be applied.

At the upper end of the body or stem 2, the material is folded to form an annular flange 4 having a lower shoulder 5 and an upper shoulder 6. Above the flange 4 the blank is substantially in the form of a hollow cylinder 7 from which the tip of the nipple is to be formed. The cylinder 7 has an outside diameter, preferably smaller than that of the stem 2 and is closed at its upper end by a dome 8, the outer surface of which is substantially semi-spherical, and the dome 8 has a circular perforation 9 on the axis 1.

The blank illustrated in Fig. 1 is next operated upon as illustrated in Fig. 2. In that figure, 10 and 11 illustrate in simplified form two cooperating die elements of a press and to be referred to later. By the operation of the die elements 10 and 11, the cylindrical portion 7 of the blank is pressed or rolled into the form indicated at 12 in Fig. 2. As shown in Fig. 2, the tip portion 12 above the flange 4 is reduced to a diameter smaller than that in Fig. 1, and the upper end of the tip 12 is given parti-spherical form, as shown at 13 of smaller radius than the dome 8 of Fig. 1, and the spherical surface is more nearly a complete sphere than the dome of Fig. 1.

By this operation, the parti-spherical portion 13 is made true and smooth and rendered suitable to serve as the pressure contact portion of the finished nipple and the portion of the tip between the spherical portion 13 and flange 4 is reduced in size to form a neck 14.

If the nipple being formed is to be a straight nipple, the operation illustrated in Fig. 2 finishes it. Such a nipple is illustrated in Fig. 7. In making such a nipple, the blank therefor is similar to that shown in Fig. 1, but the tip portion 7 thereof is shorter axially, but otherwise the same as that described in connection with that figure. The finished nipple of Fig. 7, made as above described, therefore has the press fit stem 3, the flange 4, shoulders 5 and 6 and the spherical or parti-spherical pressure contact surface 13 joined to the flange 4 by the neck portion 14. The axial perforation 9 serves to admit lubricant to the interior of the nipple from the nozzle of the gun applied thereto.

The means of attaching the nipple of Fig. 7 to the bearing element will be described later in connection with a nipple of the elbow type.

The die elements 10 and 11 may be of various types and operated in various ways. In one known type, a number of rollers are employed, of which the die elements 10 and 11 represent two, and during the operation on the blank illustrated by Fig. 2 a rolling movement is set up between the die elements 10 and 11 and the blank therebetween, and the die elements 10 and 11 are concurrently fed toward the axis of the blank. In other types of machine, one of the die elements, such as the element 10 is stationary and the die element 11 has a straight reciprocating movement toward and from the die element 10; this type of machine and die operation being that almost universally used in the rolling of threads in machine screws.

If the nipple to be formed is one of the elbow type, a blank such as illustrated in Fig. 2 is next bent at a point in the neck 14, the blank when so bent taking up the form shown in Fig. 4. Before performing the bending operation, illustrated in Fig. 4, and to be more fully described later, I may in some cases, but not in every case, perform a preliminary operation illustrated in Fig. 3.

Referring to Fig. 3, I have shown at 15 and 16 two cooperating die elements of the nipple forming press, the illustration of these parts being greatly simplified. The die element 15 has a working portion 17 conforming substantially to the outer surface of the neck 14 being approximately semi or parti-cylindrical about the axis 1 of the tip. The die element 16 has a working portion 18 which is semi or parti-cylindrical with respect to an axis at right angles to the axis 1.

The blank as finished by the operation of Fig. 2 is placed between the die elements 15 and 16 and these two elements moved relatively toward each other, to press into one side of the tip wall a depression or dent, as shown at 19 in Fig. 3. The dent 19 is preferably disposed as near to the shoulder 6 of the flange 4 as practicable. The purpose of the dent 19 is to determine the bending point of the tip when converted by the next succeeding operation into a nipple of the elbow type. The die element 15 may conform not only to the wall of the neck 14, but also to the shoulder 6 to prevent shifting of the blank between the die elements 15 and 16, when pressure therebetween is set up.

The operation of bending the tip will now be described in connection with Fig. 4. The stem 2 of the blank is inserted or fitted into a bore 20 in a suitable supporting die element or fixture 21 with the shoulder 5 of the flange 4 firmly seated on a face 22 of the die element 21. A bending tool 23 of generally hollow cylindrical form is passed over the spherical end 13 of the blank. The inner end of the tool 23 is tapered to generally conical form and terminates in a rounded edge 24. If the operation illustrated in Fig. 3 has been performed on the blank, the edge 24 is placed opposite to or in the dent 19 to position it. The diameter of the cylindrical bore 25 of the tool 23 is such as to substantially fit the spherical pressure contact surface 13 of the nipple. By inserting the end of the nipple tip into the bore 25 or vice versa and rocking the tool 23 clockwise, as viewed in Fig. 4, the end of the tip may be bent laterally into the form shown in Fig. 4, thus forming a nipple of the elbow type.

It will be observed that by forming the bore 25 of the tool 23 substantially the same diameter as that of the spherical surface 13 of the nipple or very slightly larger, the pressure of the tool upon the spherical surface will not mutilate or deform the same and thus will retain thereon its pressure contact sealing quality. Also, the bending force of the tool 23 is applied to the nipple tip at two points, one near its outer end, as at 26, and the other adjacent to the flange 4, as at 27, these points being diagonally opposite on the nipple tip, and the bend on the concave side of the elbow is therefore sharp, as at 27, while that on the convex side is on a longitudinal radius, as at 28, thus avoiding undue closing of the passage way through the neck 14 of the nipple.

It will be observed that by disposing the sharp concave bend 27 adjacent the flange 4, the axis 35 of the nipple tip and of the spherical portion 13 thereof, passes through the flange 4. This has the important advantage of lessening the liability of prying the nipple out of its seat in the bearing element to which it is press-fitted, when gun nozzle pressure is applied to the spherical portion 13 when the nipple is used, and has the further advantage of preventing bending of the nipple by the gun nozzle pressure.

The operation illustrated in Fig. 3 is, as above stated, optional, and in some cases, the operation illustrated in Fig. 4 may be performed directly after that illustrated in Fig. 2. Also, with or without performing the operation of Fig. 3, the nipple tip may be bent over to form an elbow nipple by other operations than that illustrated in Fig. 4.

One such operation would be to apply lateral pressure to the outer end of the tip by means of a spherically concave tool operated to press laterally of the spherical portion 13, the spherical concave portion of the tool fitting the surface 13 and avoiding mutilation or deformation thereof.

Another alternative method would be to apply to the neck 14 of the nipple between the spherical portion 13 and the flange 4 a tool having a cylindrically concave portion fitting around the neck and applying pressure to the tool and at the same time rocking the tool to follow the movement of the neck as the neck bends. Either of these methods would bend the nipple tip into the form shown in Fig. 4 to produce an elbow type nipple.

Various means may be employed to forcibly press or assemble the nipple thus formed into the bore of the bearing element to which it is to be applied. One means and method is illustrated in Figs. 5 and 6. At 29 is illustrated the bearing element, bored as at 30 to fit the wall 3 of the nipple stem. The nipple, in this instance of the elbow type, is placed in an assembling tool illustrated simply at 31. The tool 31 is provided with a longitudinal groove 32 in which the neck 28 and spherical portion 13 of the nipple may be disposed, and on the end of the tool 31 is provided a shoulder 33 adapted to abut upon the shoulder 6 of the nipple flange. By applying longitudinal pressure to the tool 31, vertically downwardly, as illustrated in Fig. 5, the shoulder 33 will press forcibly upon the flange 4 and force the nipple stem 2 into the bore 30 and without mutilation or deformation of the spherical portion 13 of the nipple tip.

During the various operations performed on the metal of which the nipple is made, including the several drawing operations by which it is brought into the form of the blank of Fig. 1, and the rolling operation of Fig. 2, and in some cases the operation of Fig. 3, the metal may not stand the additional strain of the bending operation of Fig. 4, and in such instances, it may be preferred to anneal the neck 14 of the nipple before bending it. However, it is not desirable to heat or anneal the spherical portion 13 of the nipple because of the liability of deforming it and softening it.

The preferred method of annealing is to heat the neck of the nipple after it has been seated in the die element 21 and engaged or embraced by the bending tool 23, and by applying heat to the neck by means of a plurality of very hot pointed gas flames in a well known manner, and to bend the tip during the annealing operation. In case it is desired to make the nipple in an automatic screw machine of bar stock, which is a more brittle material, or if it is desired to heat the drawn nipples substantially instantaneously, an electric heating of the bent portion by any well known electric means is preferred.

In this manner, both the stem 2 and the spherical portion 13 are kept relatively cool by being unexposed to the heating means and also by being in contact with the relatively large mass of the die element 21 and tool 23, respectively.

Another method of annealing the blanks before the bending operation is to anneal the nipples in bulk of several thousands at a time and after cooling to perform the bending operation. The first above described annealing operation may be performed in the same machine in which the other operations are performed, and the latter described annealing method will require putting the annealed nipples through a second bending machine, but such additional handling and processing may be performed by a machine of the automatic hopper feed and punch press type and adds very little to the cost of making the nipple.

It will be understood, of course, that in some instances the annealing operation will be unnecessary, particularly if the denting operation of Fig. 3 is performed, inasmuch as this operation will permit the bending operation to be performed without exerting a cracking or breaking strain on the neck 14 at the portion 28, illustrated in Fig. 4.

One of the important aspects of my invention is the bending of the nipple neck to form the nipple into a nipple of the elbow type after the nipple has been otherwise fabricated from a single piece metal. In this connection, therefore, it will be understood that my invention is applicable to nipples which have been produced in automatic screw machines. When so produced, the nipples may be taken from the screw machines in the straight form and the bending operation of my invention performed thereon to convert them into nipples of the elbow type with or without the annealing operation.

By the above described means and method, nipples may be made at an exceedingly low cost by the continuous operation of a single machine into which a band of sheet metal is fed, a finished nipple leaving the press for every stroke thereof, the production being at a rate many times greater than that of known methods.

In cases where it is desired to thread the stem 2, such thread may be rolled thereon at the same time that the rolling operation of Fig. 2 is being performed.

The nipple of my invention may be employed with or without check valves, the functions of which are well known in this art. As illustrative of the manner of assembling check valves with nipples of the type above described, straight or elbow, reference may be had to my co-pending application, Serial No. 399,963, filed October 16, 1929.

Having thus described my invention in certain embodiments, I am aware that numerous and extensive departures may be made from the said embodiments, but without departing from the spirit of my invention.

I claim:

1. The method of forming a lubricant nipple of the elbow type from sheet metal which includes forming a thimble from the sheet metal by drawing and pressing operations thereon, the thimble comprising an open end and a closed end, perforating the closed end, then compressibly rolling the thimble on a portion adjacent the perforated end to provide thereon a substantially annular contact surface adapted to be engaged by a lubricant gun nozzle, then bending a portion of the nipple disposed between the closed end and the open end laterally of the longitudinal axis of the open end.

2. The method of forming lubricant nipples from sheet metal which includes forming a thimble from the sheet metal by successive drawing and pressing operations thereof, the thimble comprising a closed end, a perforation in the closed end, an open end and a flange between the open and closed ends formed by an outwardly projecting annular fold in the thimble wall, the thimble between the flange and the closed end being of smaller diameter than the open end and the thimble between the flange and the open end being substantially cylindrical to adapt it to be press-fitted into a bore in a bearing element to be lubricated, and then compressibly reducing the diameter of the thimble between the flange and the closed end to provide a neck and compressibly rolling the thimble on a portion adjacent the closed end and beyond the neck to provide thereon a contact surface for engagement by a lubricant gun nozzle.

3. The method of forming a lubricant nipple of the elbow type from sheet metal which includes forming a thimble from the sheet metal by drawing and pressing operations thereon the thimble comprising an open end and a closed end and a perforation in the closed end, then compressibly rolling the thimble on a portion adjacent the closed end to provide thereon a contact surface adapted to be engaged by a lubricant gun nozzle, the telescoping over the closed end of the thimble, the cylindrical bore of tubular tool, the diameter of which bore is substantially the same as that of the said contact surface and rocking the tool on a portion thereof adjacent the end of the bore engaged with the side wall of the thimble to bend the nipple at a point between the open end and the closed end.

4. The method of forming lubricant nipples from sheet metal which includes forming a thimble from sheet metal by drawing and pressing operations of the metal, the thimble having a closed end and an open end, and a perforation in the closed end, then compressibly rolling the thimble to produce between the closed and open ends a neck of reduced diameter, and compressibly rolling the thimble on a portion adjacent the closed end to provide thereon an annular contact surface, then denting the neck of the thimble on one side thereof, then bending the neck laterally with respect to the thimble axis at said dent.

5. The method of forming lubricant nipples from sheet metal which includes forming a thimble from the sheet metal by drawing and pressing operations thereof, the thimble comprising an open end and a closed end and a perforation in the closed end, compressibly rolling the thimble on portions between the closed end and open end to provide a neck in the thimble and contact surface on a portion adjacent the closed end, denting the thimble inwardly at one side of the neck, and then applying pressure on the thimble at a point adjacent to the closed end to bend the same laterally with respect to the longitudinal axis of the thimble end at the dent.

6. The method of forming lubricant nipples from sheet metal which includes forming a thimble from the sheet metal by drawing and pressing operations, the thimble comprising an open end and a closed end and a perforation in the closed end, compressibly rolling the thimble on a portion adjacent its closed end to provide a contact surface thereon, compressing a dent inwardly in the side wall of the thimble, telescoping over the closed end of the thimble a tubular tool, the bore of which substantially fits the said spherical surface, applying the end of the tubular tool to the thimble at said dent and rocking the tool to bend the thimble at said dent.

7. The method of forming lubricant nipples from sheet metal which includes forming a thimble from the sheet metal by drawing and pressing operations thereof, the thimble comprising an open end and a closed end, and a perforation in the closed end and a flange between the open and closed ends comprising an annular outwardly projecting fold in the side wall of the thimble, compressibly rolling the thimble on a portion adjacent the closed end to provide thereon a contact surface, bending the nipple laterally with respect to its longitudinal axis in a manner to provide a relatively sharp concave bend closely adjacent to the flange on one side of the thimble and a convex bend of relatively large radius on the opposite side of the thimble.

In testimony whereof I hereunto affix my signature this 12 day of March, 1930.

OSCAR U. ZERK.